US010787759B2

(12) United States Patent
Ishikawa et al.

(10) Patent No.: US 10,787,759 B2
(45) Date of Patent: Sep. 29, 2020

(54) NEEDLE PLATE DETACHABLE MECHANISM AND SEWING MACHINE HAVING NEEDLE PLATE DETACHABLE MECHANISM

(71) Applicant: JANOME SEWING MACHINE CO., LTD., Hachioji-shi, Tokyo (JP)

(72) Inventors: Saki Ishikawa, Hachioji (JP); Koji Maeda, Hachioji (JP)

(73) Assignee: JANOME SEWING MACHINE CO., LTD., Hachioji-shi, Tokyo (JP)

( * ) Notice: Subject to any disclaimer, the term of this patent is extended or adjusted under 35 U.S.C. 154(b) by 21 days.

(21) Appl. No.: 16/296,240

(22) Filed: Mar. 8, 2019

(65) Prior Publication Data

US 2019/0352827 A1 Nov. 21, 2019

(30) Foreign Application Priority Data

May 18, 2018 (JP) .................................. 2018-96051

(51) Int. Cl.
| | | |
|---|---|---|
| *D05B 73/12* | (2006.01) | |
| *D05B 73/00* | (2006.01) | |
| *F16B 1/00* | (2006.01) | |

(52) U.S. Cl.
CPC ........... *D05B 73/12* (2013.01); *D05B 73/005* (2013.01); *F16B 2001/0035* (2013.01)

(58) Field of Classification Search
CPC .................. D05B 73/12; D05B 73/005; F61B 2001/0035
See application file for complete search history.

(56) References Cited

U.S. PATENT DOCUMENTS

| | | | | |
|---|---|---|---|---|
| 5,775,245 | A | 7/1998 | Sato et al. | |
| 6,112,684 | A * | 9/2000 | Papajewski | D05B 57/26 112/185 |
| 2005/0045084 | A1* | 3/2005 | Stucki | D05B 59/04 112/186 |
| 2006/0065175 | A1* | 3/2006 | Ota | D05B 57/20 112/228 |
| 2007/0044698 | A1* | 3/2007 | Fujihara | D05B 87/00 112/302 |
| 2013/0118394 | A1* | 5/2013 | Yeh | D05B 39/00 112/470.17 |
| 2016/0040342 | A1* | 2/2016 | Maeda | D05B 73/12 112/260 |
| 2018/0245256 | A1* | 8/2018 | Capt | D05B 27/22 |
| 2019/0352825 | A1* | 11/2019 | Yanagisawa | D05B 73/005 |
| 2019/0352827 | A1* | 11/2019 | Ishikawa | F16B 1/00 |

FOREIGN PATENT DOCUMENTS

| | | | | |
|---|---|---|---|---|
| JP | H05-68764 | A | 3/1993 | |
| JP | H09-299674 | A | 11/1997 | |
| JP | 2019198558 | A * | 11/2019 | ........... D05B 73/005 |

* cited by examiner

*Primary Examiner* — Danny Worrell
(74) *Attorney, Agent, or Firm* — Yokoi & Co., U.S.A.; Toshiyuki Yokoi

(57) ABSTRACT

In order to improve detachability of a needle plate, a needle plate detachable mechanism has a needle plate which is provided on a bed part of the sewing machine and made of a magnetic body; a magnet which is provided below the needle plate for fixing the needle plate by magnetic force; and a magnetic force changing mechanism which is connected with the magnet for changing the magnetic force acting on the needle plate by relatively moving the magnet with respect to the needle plate.

5 Claims, 10 Drawing Sheets

Fig. 7

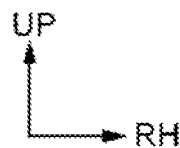
Fig. 10A
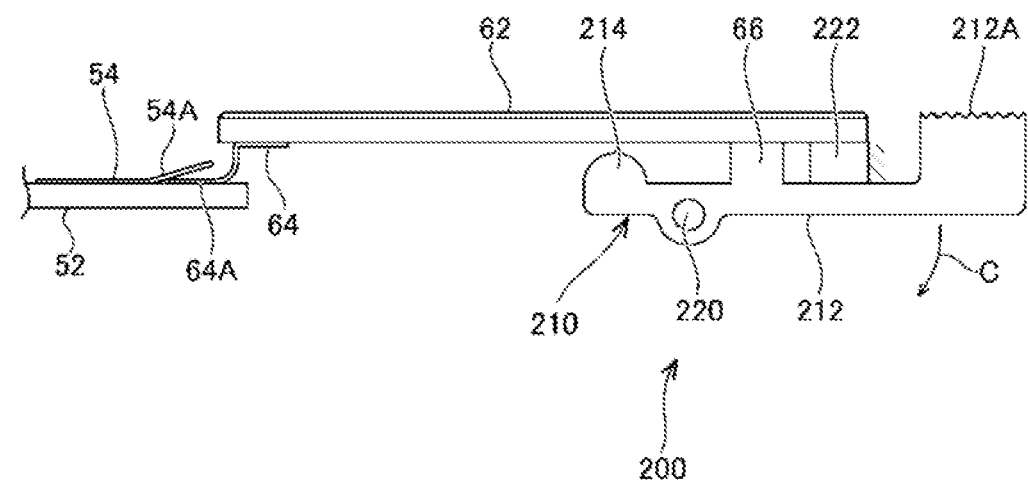
Fig. 10B
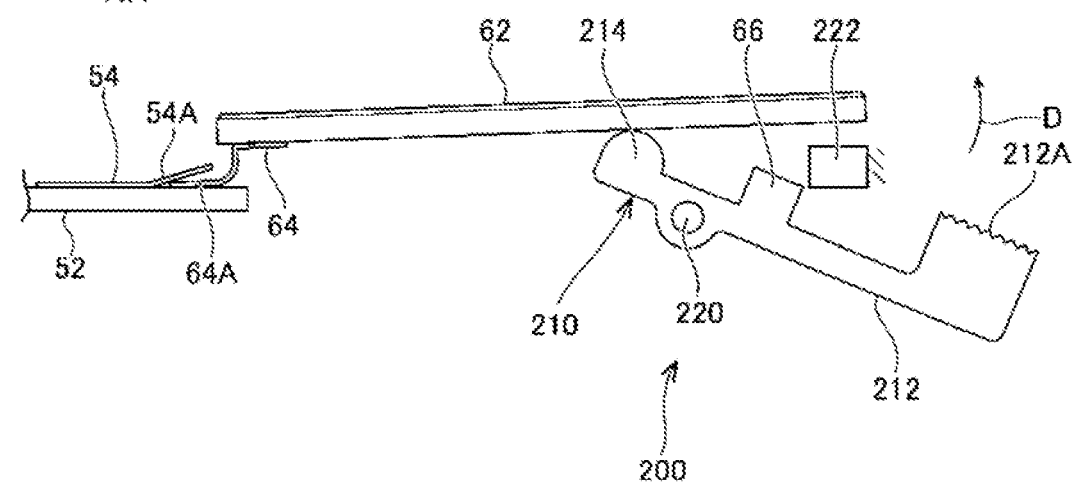

NEEDLE PLATE DETACHABLE MECHANISM AND SEWING MACHINE HAVING NEEDLE PLATE DETACHABLE MECHANISM

CROSS-REFERENCES TO RELATED APPLICATIONS

This patent specification is based on Japanese patent application, No. 2018-96051 filed on May 18, 2018 in the Japan Patent Office, the entire contents of which are incorporated by reference herein.

BACKGROUND OF THE INVENTION

1. Field of the Invention

The present invention relates to a needle plate detachable mechanism and a sewing machine having the needle plate detachable mechanism.

2. Description of the Related Art

Patent document 1 below discloses a sliding plate device attached to a head of the sewing machine. In the sliding plate device, a sliding plate is formed by a sliding plated body and an opening/closing plate and the opening/closing plate is fixed by a magnetic force of a magnet. An upper part of a hook can be opened by detaching the opening/closing plate from the head against the magnetic force of the magnet and sliding the sliding plated body leftward.

[Patent document 1] Japanese Unexamined Patent Application Publication No. H9-299674

BRIEF SUMMARY OF THE INVENTION

When the detachable structure of the opening/closing plate of the above described sliding plate device is applied to a needle plate detachable structure of the sewing machine, a magnet is arranged below a needle plate, for example, and the needle plate is fixed to the head by the magnetic force of the magnet. Consequently, in order to attach the needle plate to the head, the needle plate can be attached to the head by pulling the needle plate toward the head side by the magnetic force of the magnet.

On the other hand, in order to detach the needle plate from the head, same as the above description, a releasing force against the magnetic force of the magnet is input to the needle plate to release a fixed state of the magnet with respect to the needle plate. However, at that time, since a predetermined fixing force (magnetic force) is acting on the needle plate, the needle plate may be suddenly jumped up from the head by the releasing force when the fixed state is released. Therefore, when the above described detachable structure is applied to the needle plate, the detachability of the needle plate may be deteriorated.

Considering the above described fact, the present invention provides a needle plate detachable mechanism capable of improving the detachability of the needle plate and a sewing machine having the needle plate detachable mechanism.

One or more embodiments of the present invention relate to a needle plate detachable mechanism of a sewing machine which forms a seam by vertically driving a needle by a driving force of a sewing machine motor, having: a needle plate which is provided on a bed part of the sewing machine and made of a magnetic body; a magnet which is provided below the needle plate for fixing the needle plate by magnetic force; and a magnetic force changing mechanism which is connected with the magnet for changing the magnetic force acting on the needle plate by relatively moving the magnet with respect to the needle plate.

One or more embodiments of the present invention relate to the needle plate detachable mechanism characterized in that the magnetic force changing mechanism has a rotary body which is arranged below the needle plate and rotatable around an axis parallel with the needle plate, and the magnet is rotatable integrally with the rotary body.

One or more embodiments of the present invention relate to the needle plate detachable mechanism characterized in that the magnetic force changing mechanism has a push-up portion which is provided on the rotary body to be rotatable integrally with the rotary body, and the push-up portion pushes the needle plate upward when the rotary body is rotated.

One or more embodiments of the present invention relate to the needle plate detachable mechanism characterized in that a rotary body driving mechanism is connected with the rotary body, and the rotary body driving mechanism has a rotary body driving motor for driving the rotary body.

One or more embodiments of the present invention relate to the needle plate detachable mechanism characterized in that an operation of the rotary body driving motor is prohibited in a fixed state of the needle plate when the needle is positioned below an upper surface of the needle plate or when the sewing machine motor is driven.

One or more embodiments of the present invention relate to a sewing machine having the above described needle plate detachable mechanism.

One or more embodiments of the present invention relate to the needle plate detachable mechanism having a detector for detecting a vertical position of the needle, wherein the rotary body driving motor is operated interlockingly with the detector to prohibit the operation of the rotary body driving motor when the needle is positioned below an upper surface of the needle plate.

By adopting the needle plate detachable mechanism and the sewing machine having the above described configuration, the detachability of the needle plate can be improved.

BRIEF DESCRIPTION OF THE DRAWINGS

FIG. 7 is a timing chart of the needle plate detachable mechanism of the first embodiment.

FIG. 10A is a front view of the fixed state of the needle plate shown in FIG. 8, viewed from the front. FIG. 10B is a front view showing the state where a rotary shaft of the needle plate detachable mechanism is rotated from the state shown in FIG. 10A to a release position and the needle plate is pushed upward.

DETAILED DESCRIPTION OF THE INVENTION

First Embodiment

Figure 1:
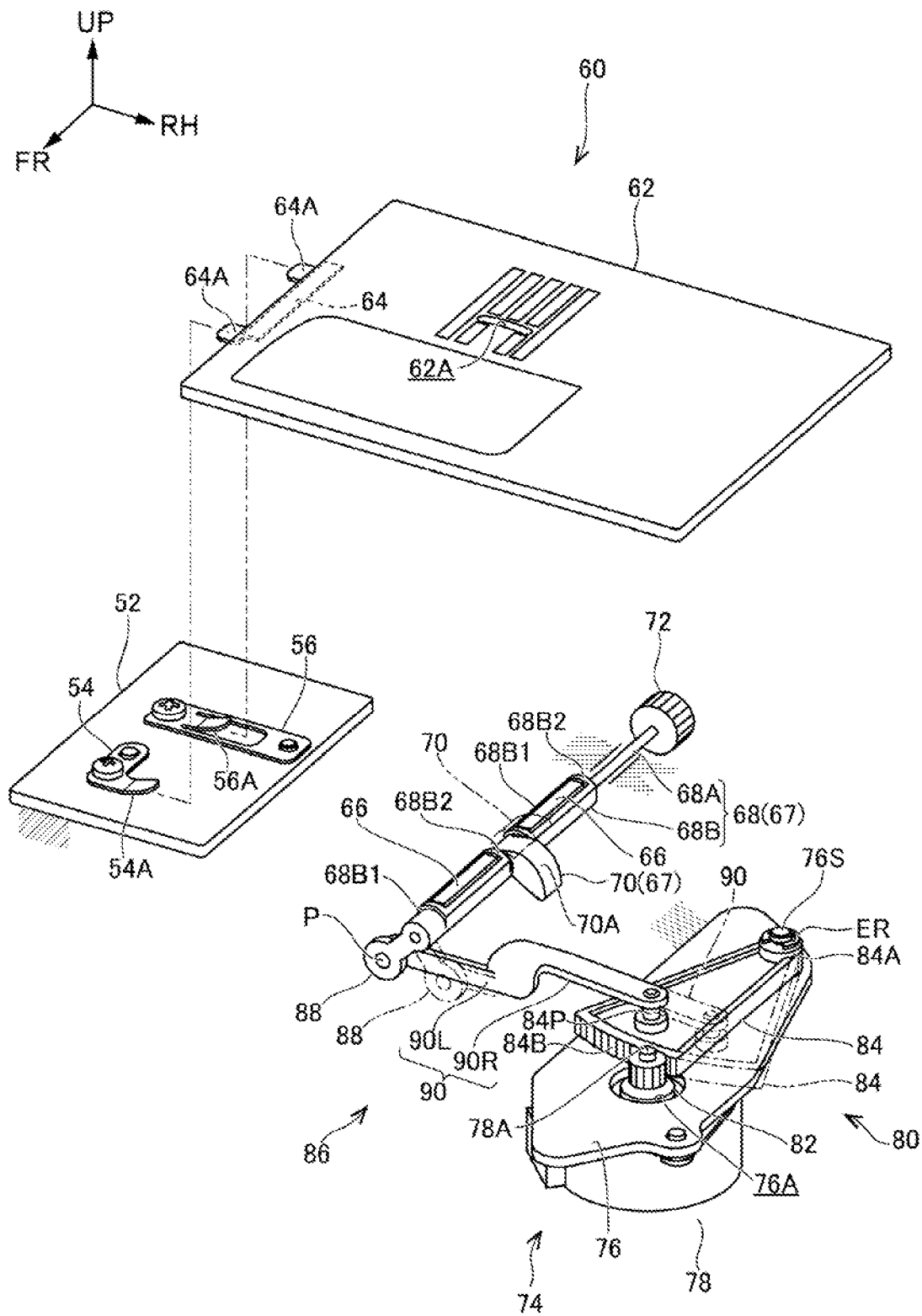
FIG. 1 is an exploded perspective view of a needle plate detachable mechanism of the first embodiment.

Hereafter, with reference to FIGS. 1-7, a sewing machine 10 to which a needle plate detachable mechanism 60 of the first embodiment is applied will be explained. In the arrow marks shown in the drawings, the arrow mark UP indicates upward, the arrow mark FR indicates frontward, and the arrow mark RH indicates rightward (one of the width direction) of the sewing machine 10. Hereafter, when front-rear, up-down and left-right directions are used in the explanation, the directions indicate the front-rear, up-down and left-right directions of the sewing machine 10 unless otherwise defined.

(Entire Constitution of Sewing Machine)

Figure 2:
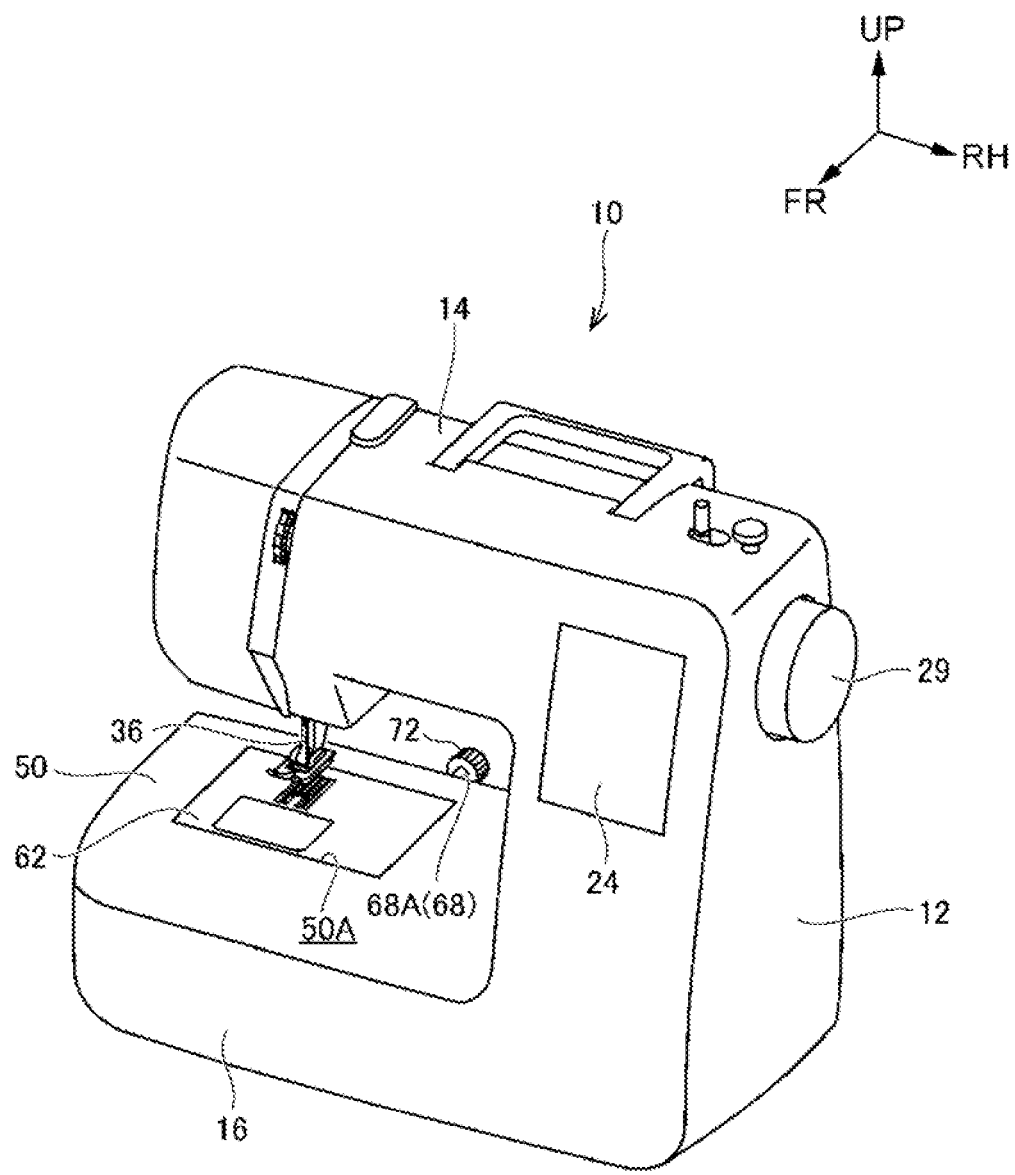
FIG. 2 is a perspective view of an entire sewing machine to which the needle plate detachable mechanism of the first embodiment is applied, viewed obliquely from the front right.

As shown in FIG. 2, the sewing machine 10 as a whole has an approximately U-shape opened to the left side in a front view when viewed from the front. Specifically, the sewing machine 10 includes a post part 12 which is vertically extended to form the right end of the sewing machine 10, an arm part 14 which is extended to the left from the upper end of the post part 12, and a bed part 16 which is extended to the left from the lower end of the post part 12. In addition, a skeleton frame (not shown in the figure) forming a frame of the sewing machine 10 is provided inside the sewing machine 10.

In addition, the sewing machine 10 has a needle plate 62 which is provided on an upper part of the left side of the bed part 16. Furthermore, the sewing machine 10 has a needle plate detachable mechanism 60 (shown in FIG. 1) for detachably fixing the needle plate 62 and a needle drive mechanism 20 (shown in FIG. 3) for vertically driving a needle 36. Hereafter, configurations of the sewing machine 10 will be explained.

(About Needle Drive Mechanism)

Figure 3:
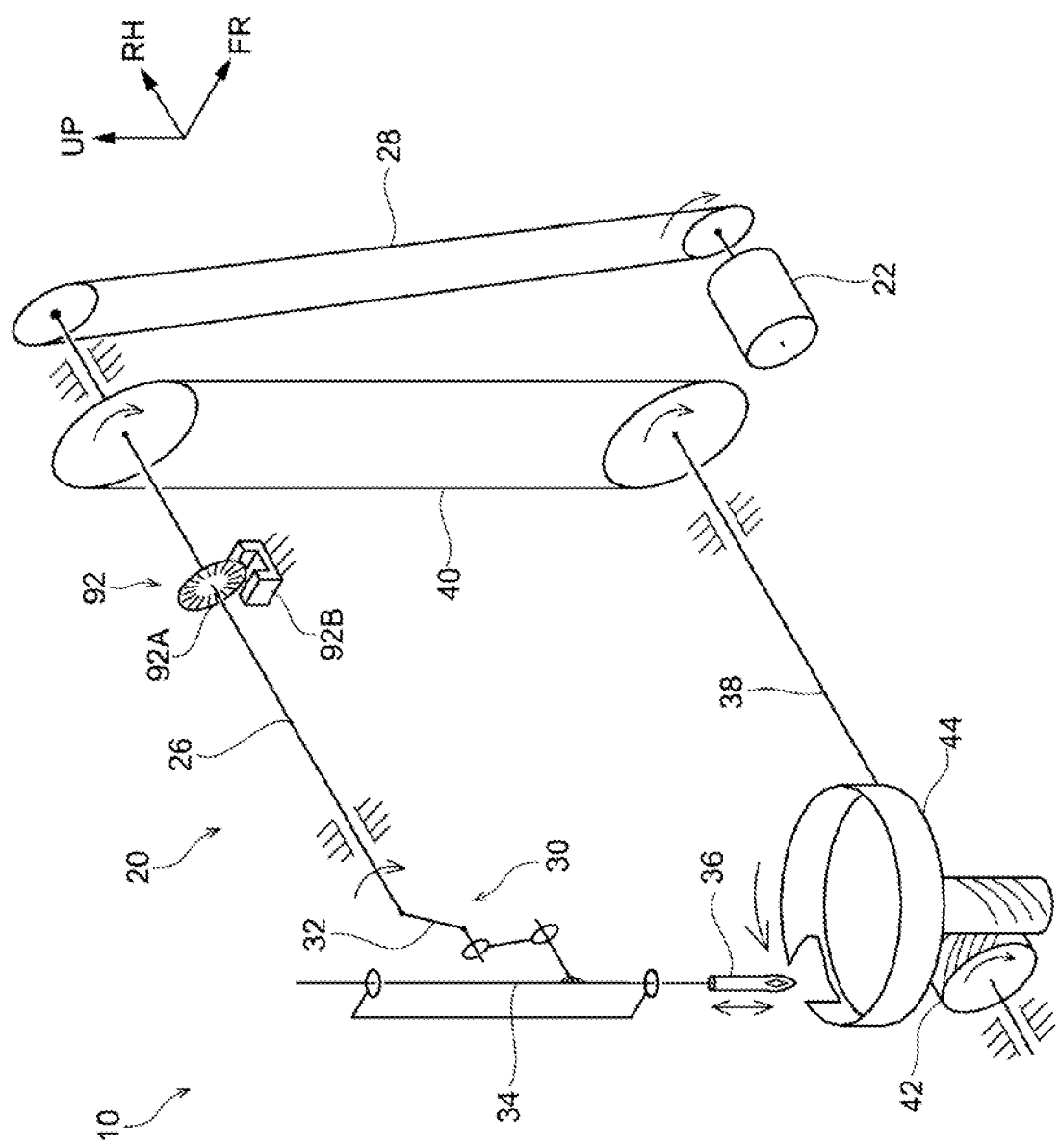
FIG. 3 is a schematic diagram schematically showing a drive mechanism of the sewing machine shown in FIG. 2.
Figure 4A:
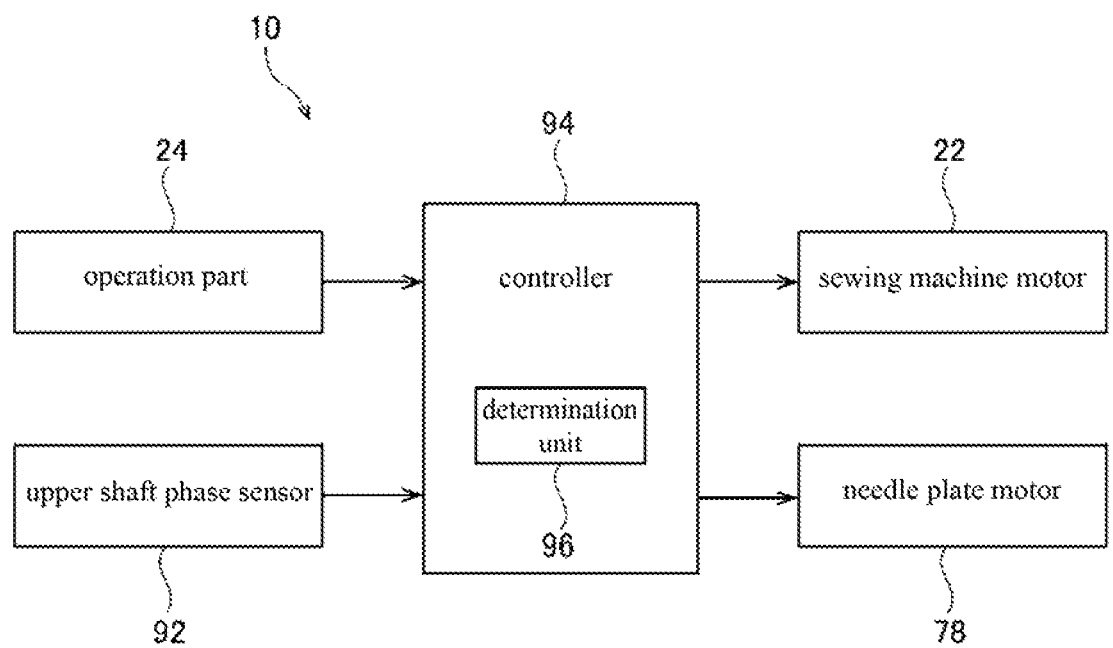
FIG. 4A is a block diagram of the sewing machine shown in FIG. 2.

As shown in FIG. 3, the needle drive mechanism 20 includes a sewing machine motor 22, an upper shaft 26, a connection mechanism 30, a needle bar 34 and a lower shaft 38. The sewing machine motor 22 is fixed to the skeleton frame so that the axial direction of the sewing machine motor 22 is aligned with the left-right direction. As shown in FIG. 4A, the sewing machine motor 22 is electrically connected with a controller 94 which will be explained later. An operation part 24 is electrically connected with the controller 94. As shown in FIG. 2, the operation part 24 is provided on the front part of the sewing machine 10 (post part 12) so as to be operable. The operation part 24 includes a display part and a touch panel. When an operator touches icons displayed on the operation part 24, operation signals of the sewing machine motor 22 and the later described needle plate motor 78 are outputted from the operation part 24 to the controller 94.

As shown in FIG. 3, the upper shaft 26 is rotatably supported by the skeleton frame in the arm part 14 (not shown in FIG. 3) so that the axial direction of the upper shaft 26 is aligned with the left-right direction. In addition, a belt 28 is laid between the right end of the upper shaft 26 and an output shaft of the sewing machine motor 22. Thus, rotative force of the sewing machine motor 22 is transferred to the upper shaft 26. Consequently, when the sewing machine motor 22 is driven, the upper shaft 26 is rotated around its axis. In addition, a flywheel 29 (shown in FIG. 2) is connected with the right end of the upper shaft 26. The flywheel 29 is arranged on the right side of the post part 12 of the sewing machine 10 and exposed outside the sewing machine 10 to be operable. When an operator rotationally operates the flywheel 29, the sewing machine 10 (upper shaft 26) can be manually driven. In addition, a crank rod 32 which forms the connection mechanism 30 is connected with the left end of the upper shaft 26.

The needle bar 34 is arranged on the left side of the connection mechanism 30 so that the axial direction of the needle bar 34 is aligned with the up-down direction. The crank rod 32 of the connection mechanism 30 is connected with the needle bar 34. When the upper shaft 26 is rotated, the needle bar 34 moves vertically. In addition, the needle 36 for sewing the sewing objects is detachably fixed to the lower end of the needle bar 34. According to the vertical movement of the needle bar 34, the needle 36 is moved vertically. Namely, the vertical position of the needle 36 is determined corresponding to the rotation angle of the upper shaft 26.

Figure 4B:
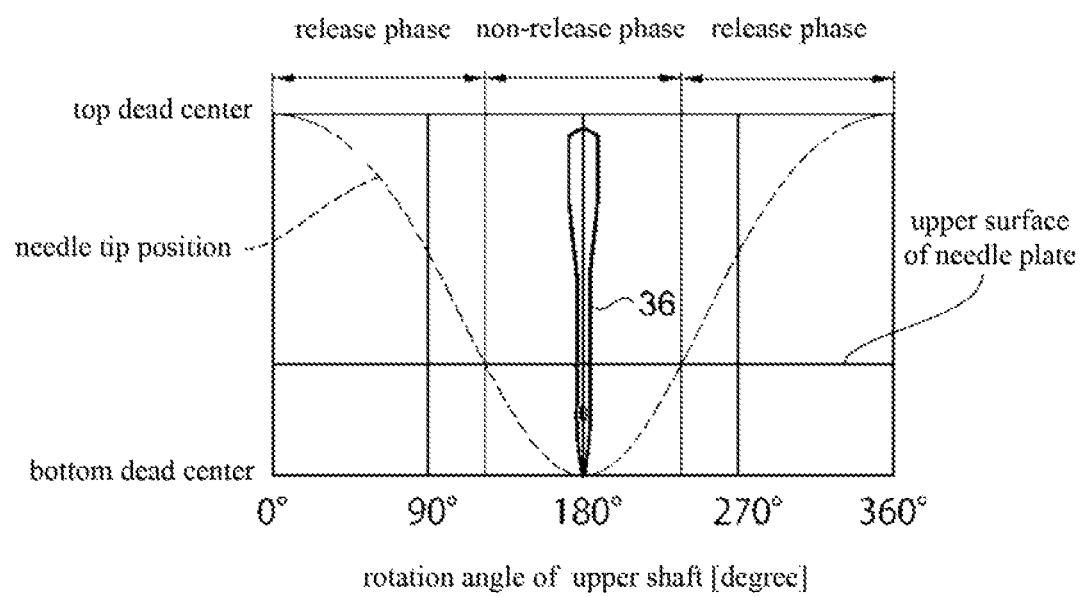
FIG. 4B is a graph showing a vertical position of a needle corresponding to a rotation angle of an upper shaft.

Specifically, as shown in FIG. 4B, the needle 36 moves vertically between the top dead center and the bottom dead center. In addition, the needle plate 62 which will be explained later is arranged between the top dead center and the bottom dead center of the needle 36. Consequently, the sewing objects are sewn by pricking the sewing objects with the needle 36 so that the needle 36 passes through the needle hole 62A formed in the needle plate 62. In the explanation below, during one cycle of the vertical movement of the needle 36, the phase of the upper shaft 26 is referred to as "release phase" when a needle tip (lower end) of the needle 36 is positioned above the upper surface of the needle plate 62, and the phase of the upper shaft 26 is referred to as "non-release phase" when the needle tip (lower end) of the needle 36 is positioned below the upper surface of the needle plate 62.

As shown in FIG. 3, the lower shaft 38 is rotatably supported by the skeleton frame in the bed part 16 (not shown in FIG. 3) so that the axial direction of the lower shaft 38 is aligned with the left-right direction. In addition, a belt 40 is laid between the right end of the lower shaft 38 and the right end of the upper shaft 26. Thus, the lower shaft 38 is rotated interlockingly with the upper shaft 26. In addition, a hook 44 is connected to the left end of the lower shaft 38 via a gear mechanism 42. When the lower shaft 38 is rotated, the hook 44 is rotated so that the axial direction of the hook 44 is aligned with the up-down direction.

(About Bed Part)

As shown in FIG. 2, the bed part 16 includes a cover 50 which forms an outer shell of the bed part 16. The skeleton frame is covered with the cover 50. In addition, a hole portion 50A is penetratingly formed on the upper wall of the cover 50 for placing the needle plate 62 which will be explained later. The hole portion 50A is formed in an approximately rectangular shape so that the longitudinal direction is aligned with the left-right direction when viewed from above.

As shown in FIG. 1, a fixing plate 52 is provided in the bed part 16 at the left side of the hole portion 50A of the cover 50 (not shown in FIG. 1). The fixing plate 52 is formed in an approximately rectangular plate shape so that the plate thickness direction is aligned with the up-down direction. The fixing plate 52 is connected and fixed to the skeleton frame. A first pressing member 54 having a plate shape and a second pressing member 56 having a plate shape are provided on the upper surface of the fixing plate 52 to fix the needle plate 62 which will be explained later. The first pressing member 54 and the second pressing member 56 are an element realized as "pressing member" in a broad sense. The first pressing member 54 and the second pressing member 56 are arranged in the front-rear direction so that the plate thickness direction is aligned in the up-down direction. The first pressing member 54 and the second pressing member 56 are fixed to the fixing plate 52 by screws. A pressing piece 54A is integrally formed with the first pressing member 54. The pressing piece 54A is inclined upward (direction separating from the fixing plate 52) toward the right side. In addition, a pressing piece 56A which is configured same as the pressing piece 54A is integrally formed with the second pressing member 56. The pressing piece 56A is inclined upward (direction separating from the fixing plate 52) toward the right side.

(About Needle Plate Detachable Mechanism)

Next, the needle plate detachable mechanism 60, which is an important part of the present invention, will be explained. As shown in FIG. 1, the needle plate detachable mechanism 60 includes a needle plate 62, a pair of magnets 66 for fixing the needle plate 62 to the bed part 16, a magnetic force changing mechanism 67 for changing the magnetic force of the magnets 66 acting on the needle plate 62, a rotary body driving mechanism 74 for driving the magnetic force changing mechanism 67, an upper shaft phase sensor 92 (shown in FIG. 3) which functions as "detector" and a controller 94 (shown in FIG. 4A).

<About Needle Plate>

The needle plate 62 is made of a magnetic body such as iron, cobalt, nickel, alloys of the above described materials and ferrite. The needle plate 62 is formed in an approximately rectangular plate shape so that the plate thickness direction is aligned with the up-down direction. The needle plate 62 is arranged in the hole portion 50A (shown in FIG. 2). A locking member 64 is provided on the lower surface of the left end (one end in the longitudinal direction) of the needle plate 62. The locking member 64 has an approximately long plate shape extending in the front-rear direction. The locking member 64 is fixed to the needle plate 62 by screws. A pair of front and rear locking pieces 64A is integrally formed with both ends in the longitudinal direction of the locking member 64. The locking pieces 64A are bent in an approximately crank shape from the left end of the locking members 64 to the left and below. The tip portions of the locking pieces 64A are inserted into a space between the fixing plate 52 and the pressing piece 54A of the first pressing member 54 and a space between the fixing plate 52 and the pressing piece 56A of the second pressing member 56 from the right side. Thus, the locking pieces 64A are fixed to the pressing pieces 54A, 56A. Consequently, the left end of the needle plate 62 is fixed to the fixing plate 52 via the locking member 64.

In addition, the needle hole 62A is penetratingly formed on the needle plate 62. When the sewing objects are sewn by the sewing machine 10, the needle 36 penetrates through the needle hole 62A.

<About Magnetic Force Changing Mechanism>

The magnetic force changing mechanism 67 includes a rotary shaft 68 which functions as "rotary body" and a cam 70 which functions as "push-up portion." The rotary shaft 68 is arranged below the right end of the needle plate 62 so that the axial direction of the rotary shaft 68 is aligned with the front-rear direction.

The rotary shaft 68 includes a core portion 68A having a circular cross-section to form an axial center of the rotary shaft 68 and an outer shaft portion 68B having an approximately cylindrical shape formed on an outer periphery of the core portion 68A. In the present embodiment, the core portion 68A is made of metal and the outer shaft portion 68B is made of resin (e.g., POM: polyoxymethylene). The core portion 68A and the outer shaft portion 68B are integrally formed by insert molding, for example. Specifically, the outer shaft portion 68B is integrally formed with the core portion 68A to cover the front side (one side in the axial direction) of the core portion 68A. Consequently, the rear end side of the core portion 68A is projected rearward compared to the outer shaft portion 68B. The rear end side of the core portion 68A is rotatably supported by the skeleton frame. Consequently, the rotary shaft 68 is rotatable around an axis which is parallel with the needle plate 62. In addition, the rear end of the core portion 68A is projected rearward compared to the cover 50 (shown in FIG. 2).

Figure 6A:
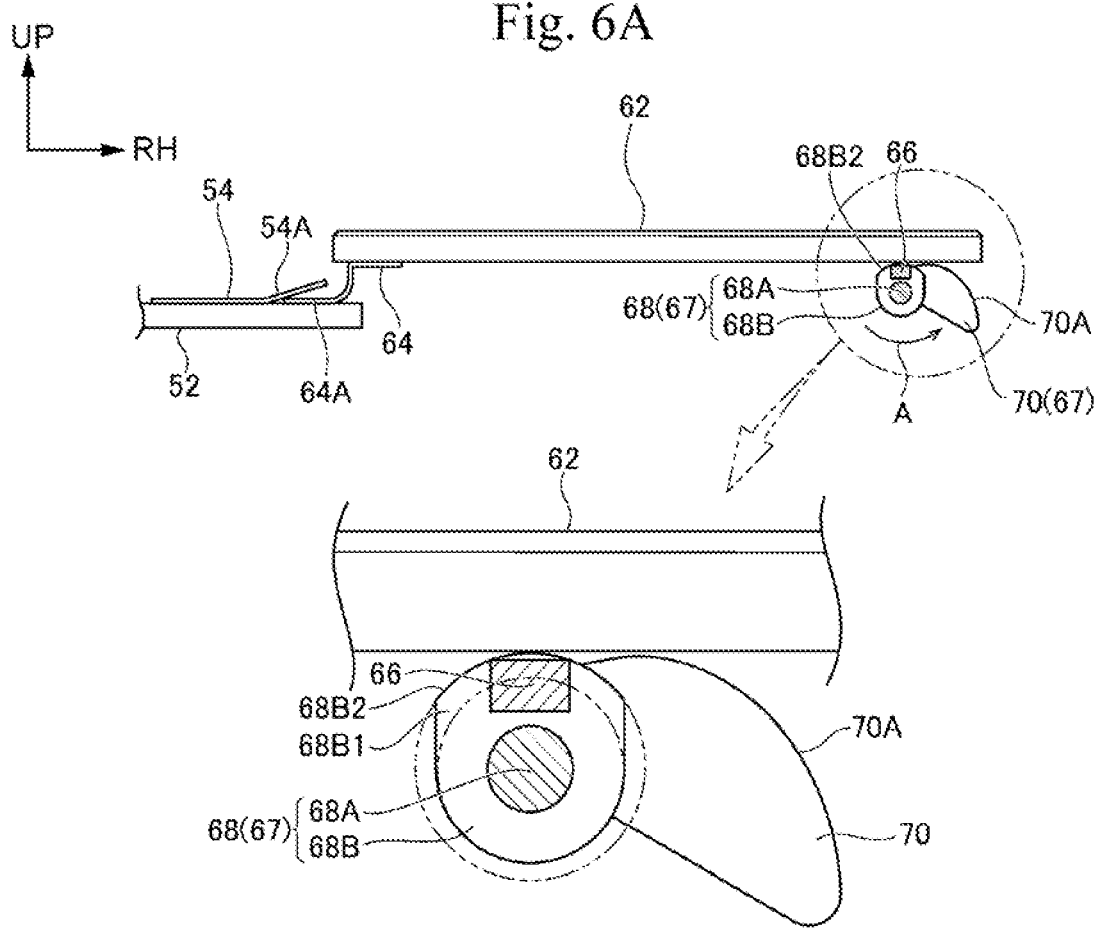
FIG. 6A is a front view of the fixed state of the needle plate shown in FIG. 1, viewed from the front.

As shown in FIG. 6A, the cam 70 is integrally provided on an intermediate portion in the longitudinal direction of the outer shaft portion 68B. The cam 70 is formed in an approximately semielliptical shape when viewed from the front and projected obliquely rearward and downward from an outer periphery of the outer shaft portion 68B. Specifically, the cam 70 has a cam face 70A which is convexly bent obliquely upward and rightward when viewed from the front. The distance from the axial center of the rotary shaft 68 to the cam face 70A is specified to become gradually longer from the base end to the tip end of the cam face 70A. The base end side of the cam face 70A is arranged adjacent to the lower side of the needle plate 62 (for detail, slightly separated downward).

A pair of front and rear protruded portions 68B1 protruded upward is formed on the outer shaft portion 68B at a position other than the front end and other than a portion where the cam 70 is formed. The upper surface of the protruded portions 68B1 is formed as a receiving surface 68B2. The receiving surface 68B2 is curved in an approximately arc shape around the axial center of the core portion 68A (rotary shaft 68) when viewed from the axial direction of the rotary shaft 68 (shown in a partial enlarged view of FIG. 6A). When the needle plate 62 is fixed to the bed part 16 by the magnets 66 which will be explained later, the lower surface of the needle plate 62 is in contact with the receiving surface 68B2. The above described position of the needle plate fixing unit 68 is shown in FIG. 6A and hereafter referred to as "fixed position."

As shown in FIG. 1 and FIG. 2, an operation dial 72 is provided on the rear end of the rotary shaft 68 (core portion 68A) so as to be integrally rotated with the rotary shaft 68. The operation dial 72 is formed in an approximately disk shape so that the axial direction of the operation dial 72 is aligned with the front-rear direction. The rear end of the rotary shaft 68 is fixed to an axial center of the operation dial 72. Consequently, the operation dial 72 is arranged on the outer side (for detail, rear side) of the cover 50 so as to be operable (shown in FIG. 2). When the operator rotates the operation dial 72, the rotary shaft 68 can be manually rotated.

<About Magnet>

As shown in FIG. 1 and FIG. 6A, a pair of magnets 66 are formed in an approximately rectangular columnar shape so that the longitudinal direction of the magnets 66 is aligned with the axial direction of the rotary shaft. The magnets 66 are arranged respectively on the front side and rear side of the cam 70 and embedded in the upper part (for detail, protruded portions 68B1) of the outer shaft portion 68B. Consequently, the magnets 66 and the outer shaft portion 68B (rotary shaft 68) are provided so as to be integrally rotated with each other. When the magnets 66 are embedded in the outer shaft portion 68B, the upper surface of the magnets 66 is exposed outside the rotary shaft 68. Furthermore, in the fixed position of the rotary shaft 68, the magnets 66 are arranged at predetermined intervals on the lower side of the needle plate 62. The upper surface of the magnets 66 and the lower surface of the needle plate 62 are arranged opposing to each other in the vertical direction (shown in a partial enlarged view of FIG. 6A). Namely, the magnets 66 are not in contact with the needle plate 62. The vertical position of the needle plate 62 is determined according to the receiving surface 68B2. In the fixed position of the rotary shaft 68, the needle plate 62 is pulled downward by magnetic force of the magnets 66 and the needle plate 62 is fixed to the bed part 16.

Figure 6B:
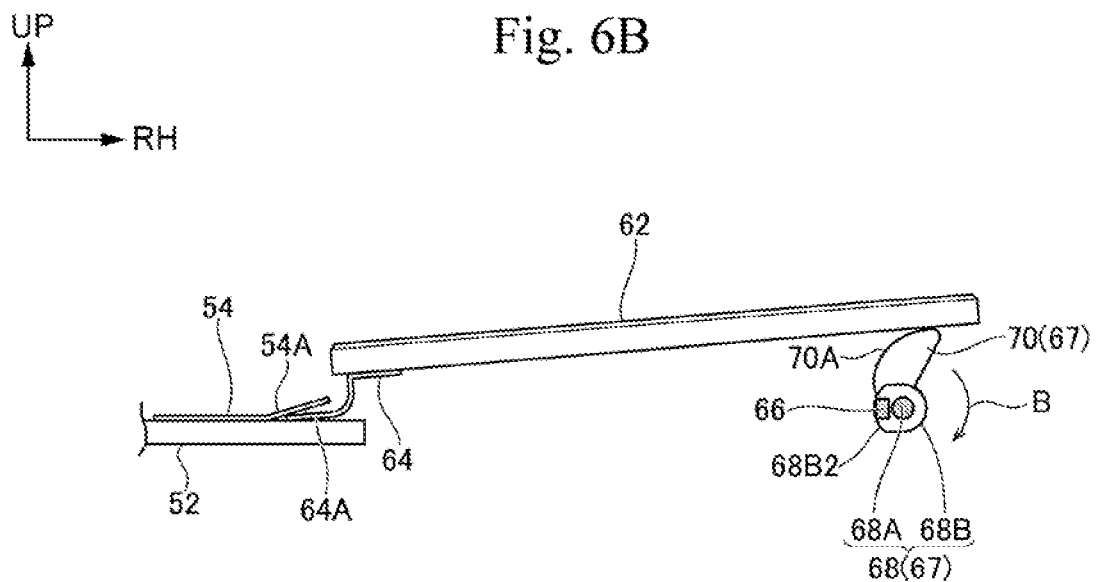
FIG. 6B is a front view showing the state where a rotary shaft of the needle plate detachable mechanism is rotated from the state shown in FIG. 6A to a release position and the needle plate is pushed upward.

Although the details will be described later, when the rotary shaft 68 is rotated from the fixed position to one of the rotation directions (direction of Arrow A in FIG. 6A), the magnets 66 are displaced leftward and downward with respect to the needle plate 62 and the cam 70 is displaced to the position projecting upward from the rotary shaft 68. Consequently, the fixed state of the needle plate 62 fixed by the magnets 66 are released and (the cam face 70A of) the cam 70 pushes the needle plate 62 upward. The above described position of the rotary shaft 68 (cam 70) is shown in FIG. 6B and hereafter referred to as "release position." Namely, when the magnetic force changing mechanism 67 is rotated (operated) from the fixed position to the release position, the magnets 66 are relatively moved by the magnetic force changing mechanism 67 with respect to the needle plate 62. Thus, the magnetic force of the magnets 66 acting on the needle plate 62 is changed.

<About Rotary Body Driving Mechanism>

As shown in FIG. 1, the rotary body driving mechanism 74 includes a base plate 76, a needle plate motor 78 which functions as "rotary body driving motor," a transmission mechanism 80 and a link mechanism 86.

[About Base Plate]

The base plate 76 is formed in an approximately rectangular plate shape extending in the front-rear direction so that the plate thickness direction is aligned with the up-down direction. The base plate 76 is arranged on the right side of the rotary shaft 68 to be separately from the rotary shaft 68. The rear end of the base plate 76 is fixed to the skeleton frame. An exposure hole 76A having a circular shape is penetratingly formed on the front part of the base plate 76 at an approximately center in the left-right direction for exposing the later described output shaft 78A of the needle plate motor 78. In addition, a support shaft 76S is provided on the rear end of the base plate 76 for rotatably supporting the later described oscillating arm 84 of the transmission mechanism 80. The support shaft 76S is formed in an approximately cylindrical shape so that the axial direction of the support shaft 76S is aligned with the up-down direction. The support shaft 76S is projected upward from the base plate 76.

[About Needle Plate Motor]

The needle plate motor 78 is arranged adjacent to the lower side of the front part of the base plate 76 so that the axial direction of the needle plate motor 78 is aligned with the up-down direction. The needle plate motor 78 is fixed to the base plate 76 at a position not shown in the figure. Specifically, the needle plate motor 78 is arranged coaxially with the exposure hole 76A of the base plate 76. The output shaft 78A of the needle plate motor 78 is arranged in the exposure hole 76A. In addition, a pinion gear 82 forming the later described transmission mechanism 80 is provided on the output shaft 78A so as to be integrally rotated with the output shaft 78A. The pinion gear 82 is arranged on an upper side of the base plate 76. In the present embodiment, the needle plate motor 78 is formed as a stepping motor and electrically connected with the controller 94 which will be explained later. The needle plate motor 78 is operated by the control of the controller 94.

[About Transmission Mechanism]

The transmission mechanism 80 includes the above described pinion gear 82 and oscillating arm 84.

The oscillating arm 84 is formed in an approximately sector plate shape when viewed from above so that the plate thickness direction is aligned with the up-down direction. The oscillating arm 84 is arranged on the upper side of the base plate 76. A support boss 84A is formed on the base end (rear end) of the oscillating arm 84. The support boss 84A is formed in an approximately cylindrical shape so that the axial direction of the support boss 84A is aligned with the up-down direction. The support shaft 76S of the base plate 76 is inserted into the support boss 84A so as to be relatively rotative. Consequently, the oscillating arm 84 is rotatably supported by the support shaft 76S. Note that an E-ring ER is locked to the tip portion (upper end) of the support shaft 76S. The oscillating arm 84 is restricted from moving upward by the E-ring ER.

A rack portion 84B is formed on the tip portion (front end) of the oscillating arm 84. The rack portion 84B is curved in an approximately arc shape around the axial center of the support boss 84A (support shaft 76S) when viewed from above. The rack portion 84B is arranged on the rear side of the pinion gear 82 of the needle plate motor 78. In addition, a plurality of rack teeth is formed on the rack portion 84B. The rack teeth are engaged with the pinion gear 82. Consequently, when the needle plate motor 78 is operated, the oscillating arm 84 swings (rotates) around the axis of the support shaft 76S. Specifically, the oscillating arm 84 reciprocally swings (rotates) between "first position" shown in a solid line and "second position" shown in a two-dot chain line in FIG. 1.

Furthermore, a connecting pin 84P is provided on the tip end side of the oscillating arm 84. The connecting pin 84P is formed in an approximately cylindrical shape so that the axial direction of the connecting pin 84P is aligned with the up-down direction. The connecting pin 84P is projected upward from the oscillating arm 84.

[About Link Mechanism]

The link mechanism 86 includes a first link 88 formed integrally with the front end of the rotary shaft 68 (outer shaft portion 68B) and a second link 90.

The first link 88 is formed in a plate shape so that the plate thickness direction is aligned with the front-rear direction. The first link 88 is extended obliquely leftward and downward from the front end of the outer shaft portion 68B when viewed from the front.

The second link 90 is formed in an approximately long plate shape extending in the left-right direction. Specifically, the second link 90 includes a link portion 90L which forms the left part of the second link 90 and a link portion 90R which forms the right part of the second link 90. The link portion 90L is arranged adjacent to the rear side of the first link 88 so that the plate thickness direction is aligned with the front-rear direction. The left end of the link portion 90L (one end in the longitudinal direction of the second link 90) is rotatably connected with the tip portion of the first link 88 by a connecting pin P so that the axial direction of the connecting pin P is aligned with the front-rear direction.

The link portion 90R is arranged on the rear side of the link portion 90L so that the plate thickness direction is aligned with the up-down direction. The front end of the left end of the link portion 90R is connected with the upper end of the right end of the link portion 90L. Consequently, the link portion 90R is arranged on the upper side of the link portion 90L. The right end of the link portion 90R (the other end in the longitudinal direction of the second link 90) is rotatably connected with the connecting pin 84P of the oscillating arm 84.

Consequently, interlocked with the reciprocating swing of the oscillating arm 84, the second link 90 reciprocally moves in the front-rear direction and the first link 88 (i.e., rotary shaft 68) reciprocally rotates around the axis of the rotary shaft 68. Specifically, the rotary shaft 68 is arranged at the fixed position when the oscillating arm 84 is in the first position, and the rotary shaft 68 is shifted to the release position when the oscillating arm 84 swings from the first position to the second position.

<About Upper Shaft Phase Sensor>

As shown in FIG. 3, the upper shaft phase sensor 92 is provided on an intermediate portion in the longitudinal direction of the upper shaft 26. The upper shaft phase sensor 92 is formed as a sensor for detecting a rotation phase of the upper shaft 26. In the present embodiment, the upper shaft phase sensor 92 is formed as a rotary encoder as an example. Specifically, the upper shaft phase sensor 92 includes a rotary plate 92A and a phase detector 92B.

The rotary plate 92A has a circular disk shape. The rotary plate 92A is arranged coaxially with the upper shaft 26 and fixed to the upper shaft 26 so as to be integrally rotated with the upper shaft 26. A plurality of slits extending in the radial direction of the rotary plate 92A is penetratingly formed on the rotary plate 92A. The slits are arranged at predetermined intervals in the circumferential direction of the rotary plate 92A.

The phase detector 92B has a light emitting element and a light receiving element although they are not illustrated. The light emitting element and the light receiving element are arranged on the rotary plate 92A opposing to each other in the plate thickness direction. The rotary plate 92A is arranged between the light emitting element and the light receiving element. In addition, the phase detector 92B is electrically connected with the controller 94 which will be explained later (shown in FIG. 4A). The light emitting element emits light toward the rotary plate 92A, and the light receiving element receives the light passing through the slits of the rotary plate 92A. Thus, the upper shaft phase sensor 92 detects the rotation angle (phase) of the upper shaft 26 and outputs the detection signals to the controller 94.

<About Controller>

As shown in FIG. 4A, the above described sewing machine motor 22, operation part 24, needle plate motor 78 and upper shaft phase sensor 92 are electrically connected with the controller 94. The controller 94 controls operations of the sewing machine motor 22 and the needle plate motor 78 based on the operation signals outputted from the operation part 24.

Furthermore, the controller 94 has a determination unit 96. The determination unit 96 determines to allow or prohibit the operations of the needle plate motor 78 and the controller 94 controls the operations of the needle plate motor 78 based on the judgement of the determination unit 96. Specifically, the determination unit 96 determines to allow and prohibit the operations of the needle plate motor 78 based on the phase state of the upper shaft 26 (i.e., vertical position of the needle 36) and the driving state of the sewing machine 10.

For more detail, when the sewing machine 10 is driven by the sewing machine motor 22 (i.e., in a motor driving state), the determination unit 96 determines to prohibit the operations of the needle plate motor 78. In addition, the determination unit 96 judges whether the rotation phase of the upper shaft 26 is the release phase or the non-release phase based on the detection signals detected by the upper shaft phase sensor 92. In other words, the determination unit 96 judges whether or not the needle tip of the needle 36 is positioned below the upper surface of the needle plate 62. When the sewing machine 10 is not driven by the motor (i.e., in a non-driving state of the sewing machine motor 22) and the phase of the upper shaft 26 is the non-release phase, the determination unit 96 determines to prohibit the operations of the needle plate motor 78. Namely, the needle plate motor 78 is operated interlockingly with the upper shaft phase sensor 92. When the sewing machine 10 is not in the motor driving state and the phase of the upper shaft 26 is in the non-release phase, the operation of the needle plate motor 78 is prohibited.

On the other hand, when the sewing machine 10 is not in the motor driving state and the phase of the upper shaft 26 is in the release phase, the determination unit 96 determines to allow the operations of the needle plate motor 78. When the determination unit 96 determines to allow the operations of the needle plate motor 78, the controller 94 operates the needle plate motor 78 based on the operation signals (operation signals for operating the needle plate motor 78) transmitted from the operation part 24.

(Operations and Effects)

Figure 5:
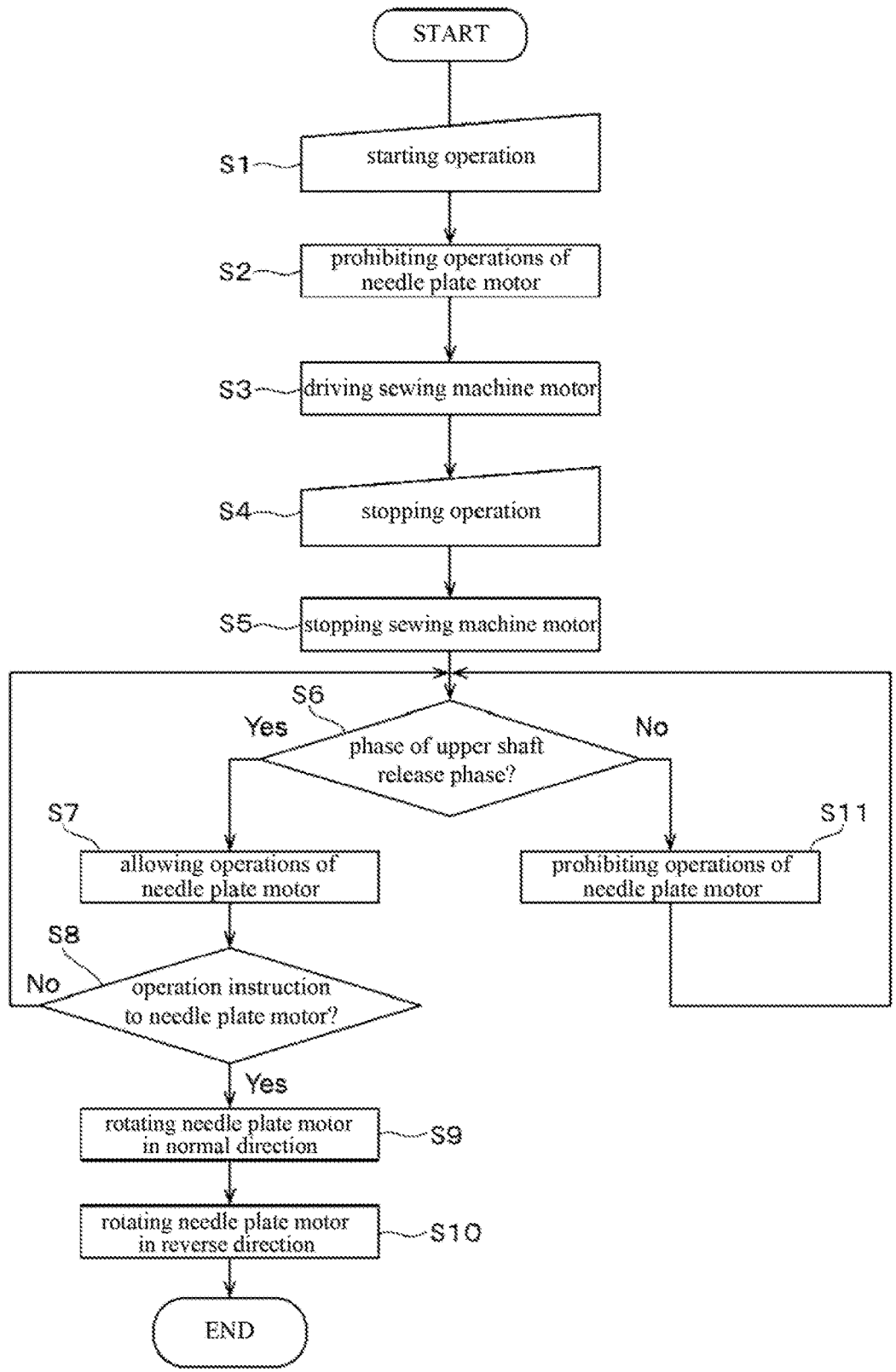
FIG. 5 is an operation flow of the needle plate detachable mechanism of the first embodiment.

Next, operations of the needle plate detachable mechanism 60 will be explained with reference to a flowchart shown in FIG. 5.

In the sewing machine 10 configured as described above, the rotary shaft 68 of the needle plate detachable mechanism 60 is arranged on the fixed position and the needle plate 62 is fixed to the bed part 16. Therefore, the upper surface of the magnets 66 provided on the rotary shaft 68 is arranged adjacent to the lower surface of the needle plate 62, and the needle plate 62 is fixed to the bed part 16 by the magnetic force of the magnets 66 (shown in FIG. 6A). In the above described state, in order to start driving the sewing machine 10, the operator performs touch operation on the icons displayed on the operation part 24 (Step S1). Consequently, the operation signals are outputted from the operation part 24 to the controller 94 and the sewing machine 10 is shifted to the motor driving state (driven by the sewing machine motor 22). Therefore, the determination unit 96 of the controller 94 determines to prohibit the operations of the needle plate motor 78 (Step S2). As a result, the non-operation state of the rotary body driving mechanism 74 is kept and the fixed state of the needle plate 62 is kept.

After the process of Step S2, the process shifts to Step S3 and the controller 94 starts driving the sewing machine motor 22. Consequently, the sewing machine 10 is shifted from the stop state to the motor driving state to sew the sewing objects.

After the process of Step S3, in order to stop driving the sewing machine 10, the operator performs touch operation on the icons displayed on the operation part 24 (Step S4). As a result, the operation signals are outputted from the operation part 24 to the controller 94. The operation of the sewing machine motor 22 is stopped by the controller 94, which receives the operation signals from the operation part 24, and the sewing machine 10 is shifted from the motor driving state to the stop state (Step S5).

After the process of Step S5, the process shifts to Step S6 and the determination unit 96 of the controller 94 judges the phase state of the upper shaft 26 based on the detection signals of the upper shaft phase sensor 92. Specifically, the determination unit 96 judges whether or not the phase of the upper shaft 26 is the release phase. When the phase of the upper shaft 26 is the release phase (Yes in Step S6), the process shifts to Step S7. In Step S7, the determination unit 96 determines to allow the operations of the needle plate motor 78.

After the process of Step S7, the process shifts to Step S8. In Step S8, icons for urging the operation instruction to the needle plate motor 78 (rotary body driving mechanism 74) are displayed on the display part of the operation part 24, and the controller 94 judges whether or not the touch operation is performed on the icons of the operation part 24.

When the operation instruction to the needle plate motor 78 is performed in Step S8 (Yes in Step S8), the process shifts to Step S9. In Step S9, the controller 94 receives the operation signals from the operation part 24 and operates the needle plate motor 78 to rotate the output shaft 78A of the needle plate motor 78 in a normal direction. Consequently, the needle plate detachable mechanism 60 is driven.

Specifically, when the needle plate motor 78 is driven, the pinion gear 82 is rotated simultaneously with the output shaft 78A of the needle plate motor 78. Consequently, the oscillating arm 84 engaged with the pinion gear 82 swings from the first position to the second position. When the oscillating arm 84 swings from the first position to the second position, the second link 90 of the link mechanism 86 connected with the oscillating arm 84 is displaced rightward. Consequently, the first link 88 which is connected with the second link 90 so as to be relatively rotative is rotated in one of the rotation directions together with the rotary shaft 68. Namely, the rotary shaft 68 is rotated in one of the rotation directions (direction of Arrow A in FIG. 6A) from the fixed position.

In addition, when the rotary shaft 68 is rotated in one of the rotation directions from the fixed position, the magnets 66 are rotated in one of the rotation directions together with the rotary shaft 68. Consequently, the magnets 66 are relatively rotated (moved) leftward and downward with respect to the needle plate 62. Thus, the magnetic force of the magnets 66 acting on the needle plate 62 is gradually reduced. Namely, the fixed state of the needle plate 62 fixed by the magnets 66 is gradually released. At that time, the cam 70 is rotated together with the rotary shaft 68 to be displaced upward. Specifically, the base end of the cam face 70A of the cam 70 abuts with the lower surface of the needle plate 62. The cam face 70A slides on the lower surface of the needle plate 62 while the contact part between the cam face 70A of the cam 70 and the needle plate 62 is changed from the base end to the tip end of the cam face 70A. Here, the distance from the axial center of the rotary shaft 68 to the cam face 70A is specified to become gradually longer from the base end to the tip end of the cam face 70A. Therefore, when the rotary shaft 68 is rotated, the needle plate 62 is pushed upward by the cam face 70A. Consequently, as shown in FIG. 6B, the needle plate 62 is separated upward from the rotary shaft 68 and detached from the bed part 16.

After the process of Step S9, the process shifts to Step S10. In Step S10, the needle plate motor 78 is operated by the controller 94 so that the output shaft 78A of the needle plate motor 78 is reversely rotated when a predetermined time has passed after finishing the process of Step S9. Consequently, the rotary body driving mechanism 74 is driven again. Specifically, the rotary shaft 68 (cam 70) is rotated in the other of the rotation directions (direction of Arrow B in FIG. 6B) from the release position and the rotary shaft 68 is shifted to the fixed position again. Consequently, the needle plate 62 can be attached to the bed part 16 again in the needle plate detachable mechanism 60.

On the other hand, when the operation instruction to the needle plate motor 78 is not performed in Step S8 (No in Step S8), the process returns to Step S6 and the determination unit 96 judges the phase state of the upper shaft 26 based on the detection signal transmitted from the upper shaft phase sensor 92. Namely, after the sewing machine motor 22 is stopped, the operator may sew the sewing objects with manual operation by operating the flywheel 29 without detaching (replacing) the needle plate 62. Therefore, when the operation instruction to the needle plate motor 78 is not performed in Step S8, the process returns to Step S6 and the determination unit 96 makes judgement based on the rotation phase of the upper shaft 26.

In Step S6, when the phase of the upper shaft 26 is the non-release phase (No in Step S6), the process shifts to Step S11. In Step S11, the determination unit 96 determines to prohibit the operation of the needle plate motor 78. As a result, the icons for urging the operation instruction to the needle plate motor 78 (rotary body driving mechanism 74) are not displayed on the operation part 24 (or the icons are displayed in an inoperable state). Thus, the operation instruction to the needle plate motor 78 is disabled. Namely, the non-operation state of the rotary body driving mechanism 74 is kept and the fixed state of the needle plate 62 is kept. After the process of Step S11, the process returns to Step S6 and the determination unit 96 repeats the judgement based on the rotation phase of the upper shaft 26.

Hereafter, the operation of the needle plate detachable mechanism 66 explained with reference to the above described flowchart will be further explained with reference to the timing chart shown in FIG. 7. In the timing chart of FIG. 7, (1) indicates the driving state of the sewing machine 10 and (2) indicates the operation state of the sewing machine motor 22. In addition, in the timing chart of FIG. 7, (3) indicates the phase state of the upper shaft 26 and (4) indicates the judgement state of the determination unit 96 with respect to the needle plate motor 78.

In the stop state (shown as stage "a" in FIG. 7) of the sewing machine 10, the sewing machine motor 22 is in the non-operation state (OFF state). At that time, the phase of the upper shaft 26 is the release phase, and the needle 36 is positioned above the needle plate 62. Therefore, the determination unit 96 determines to allow the operation of the needle plate motor 78. Namely, the operation of the rotary body driving mechanism 74 is allowed.

Figure 7:
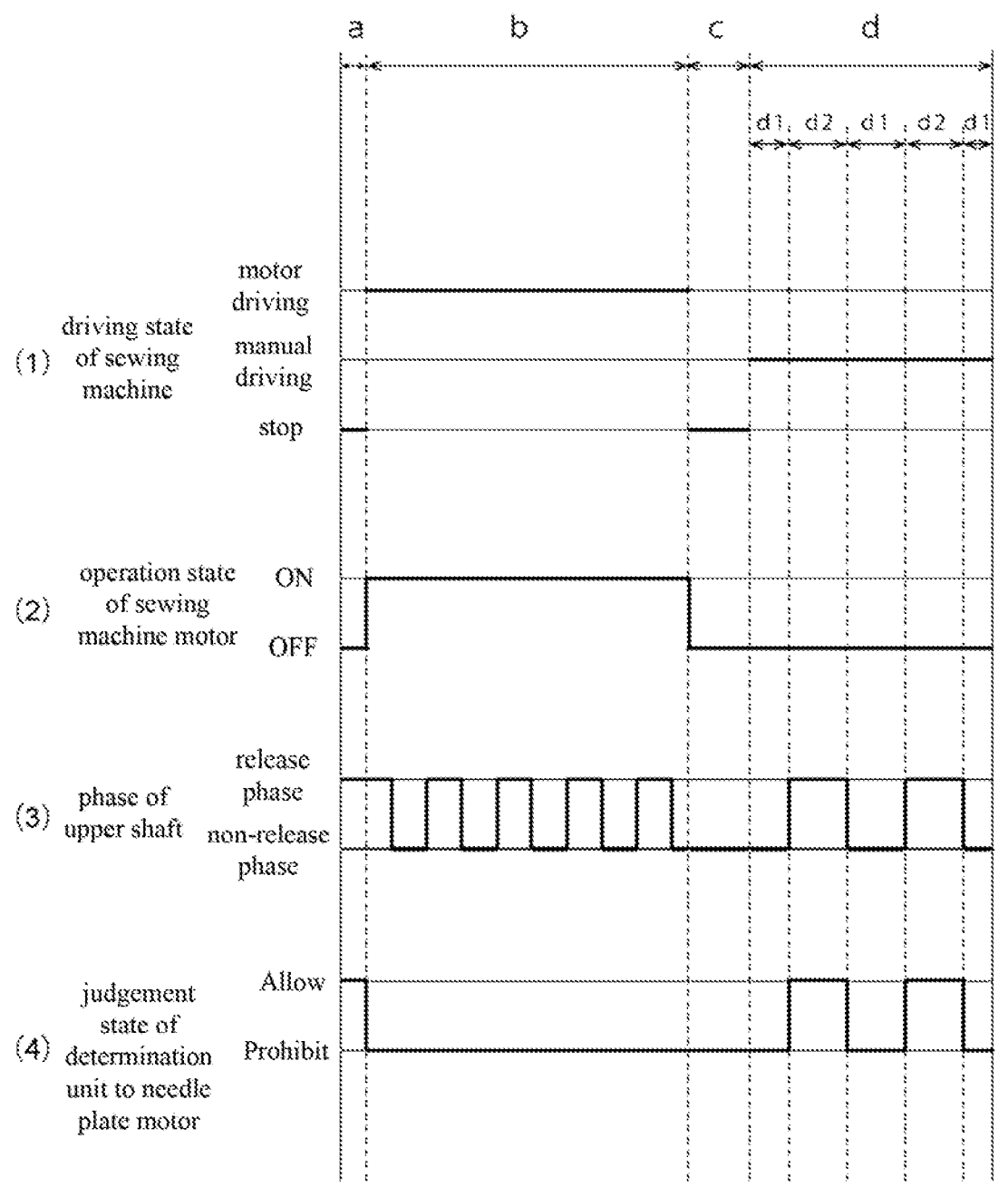

In the stop state of the sewing machine 10, when the operator operates the operation part 24 to start driving the sewing machine 10, the sewing machine 10 is shifted from the stop state to the motor driving state (shown as stage "b" in FIG. 7). Therefore, the sewing machine motor 22 is operated by the controller 94 and shifted from the non-operation state (OFF state) to the operation state (ON state). Consequently, the upper shaft 26 is rotated and the needle 36 is vertically moved. Thus, the phase of the upper shaft 26 is repeatedly changed between the release phase and the non-release phase. In the above described state, the determination unit 96 determines to prohibit the operation of the needle plate motor 78.

From the above described state, when the operator operates the operation part 24 to shift the sewing machine 10 from the motor driving state to the stop state (shown as stage "c" in FIG. 7), the operation of the sewing machine motor 22 is stopped by the controller 94. Thus, the sewing machine motor 22 is shifted from the operation state (ON state) to the non-operation state (OFF state). In the example shown in FIG. 7, when the driving of the sewing machine 10 is stopped, the phase of the upper shaft 26 is the non-release phase. Therefore, the determination unit 96 determines to prohibit the operation of the needle plate motor 78. Thus, the non-operation state of the needle plate motor 78 is kept.

From the above described state, when the operator manually operates the sewing machine 10 by using the flywheel 29 of the sewing machine 10, the sewing machine 10 is shifted from the stop state to the manual driving state (shown as stage "d" in FIG. 7). In the above described state, the non-operation state of the sewing machine motor 22 is kept. In addition, since the upper shaft 26 is rotated in the manual operation, the phase of the upper shaft 26 is changed between the non-release phase (shown as stage "d1" in FIG. 7) and the release phase (shown as stage "d2" in FIG. 7) alternately and repeatedly. Consequently, when the phase of the upper shaft 26 is the release phase, the determination unit 96 determines to allow the operation of the needle plate motor 78. Therefore, when the operator operates the operation part 24 to drive the needle plate motor 78, the controller 94 receives the operation signals from the operation part 24 and the needle plate motor 78 is operated. Consequently, the fixed state of the needle plate 62 is released.

On the other hand, when the phase of the upper shaft 26 is the non-release phase, the determination unit 96 determines to prohibit the operation of the needle plate motor 78. Therefore, the non-operation state of the needle plate motor 78 is kept and the fixed state of the needle plate 62 is kept.

As explained above, in the needle plate detachable mechanism 60, the magnetic force changing mechanism 67 is provided below the needle plate 62, and the magnets 66 are provided on the rotary shaft 68 of the magnetic force changing mechanism 67 to be rotatable integrally with the rotary shaft 68. When the magnetic force changing mechanism 67 is operated, the magnets 66 are rotated integrally with the rotary shaft 68 of the magnetic force changing mechanism 67 and relatively rotated (moved) with respect to the needle plate 62. Consequently, the magnetic force of the magnets 66 acting on the needle plate 62 can be changed. Therefore, when the magnetic force changing mechanism 67 is operated in the fixed state of the needle plate 62, the magnets 66 are moved in the direction separating from the needle plate 62, and the magnetic force (fixing force) of the magnets 66 acting on the needle plate 62 can be gradually reduced. Thus, the releasing force for releasing the fixed state of the needle plate 62 can be reduced compared to the case where the magnets 66 cannot be relatively rotated (moved) with respect to the needle plate 62. As a result, when the needle plate 62 is detached from the bed part 16, the needle plate 62 is prevented from being suddenly jumped up from the bed part 16. Accordingly, the detachability of the needle plate 62 can be improved.

In addition, as explained above, the magnets 66 are provided on the rotary shaft 68 of the magnetic force changing mechanism 67 so as to be integrally rotated, and the rotary shaft 68 is rotatable around an axis which is parallel with the needle plate 62. Therefore, the magnetic force of the magnets 66 acting on the needle plate 62 can be changed by a simple configuration.

In addition, the magnetic force changing mechanism 67 has the cam 70 which is provided on the rotary shaft 68 to be rotatable integrally with the rotary shaft 68. The cam 70 is protruded outside the rotary shaft 68 from an outer periphery of the outer shaft portion 68B. Therefore, when the rotary shaft 68 is rotated in one of the rotation directions from the fixed position, the cam 70 abuts with the needle plate 62 and the needle plate 62 can be pushed upward by the cam 70 with respect to the bed part 16. Accordingly, convenience for replacing the needle plate 62 can be improved.

In addition, the cam 70 has the cam face 70A. The cam face 70A is configured to be slidable on the lower surface of the needle plate 62. The distance from the axial center of the rotary shaft 68 to the cam face 70A is specified to become gradually longer from the base end to the tip end of the cam face 70A. Therefore, when the rotary shaft 68 is rotated from the fixed position to the release position, the needle plate 62 can be gradually pushed up by the cam face 70A of the cam 70. Consequently, the needle plate 62 can be pushed upward by the cam 70 with respect to the bed part 16 while the needle plate 62 is prevented from being jumped upward by the cam 70. Accordingly, the detachability of the needle plate 62 can be improved efficiently.

In the fixed position of the magnetic force changing mechanism 67, the cam 70 (cam face 70A) is arranged below the needle plate 62 to be separately from the needle plate 62. Therefore, even if the rotary shaft 68 is displaced in the circumferential direction with respect to the correct position in the fixed position of the magnetic force changing mechanism 67, the cam 70 can push the needle plate 62 upward. Accordingly, the fixed state of the needle plate 62 can be kept efficiency. In the fixed position of the magnetic force changing mechanism 67, since the cam 70 (cam face 70A) is arranged below the needle plate 62 to be separately from the needle plate 62, the cam 70 (cam face 70A) can be in contact with the needle plate 62 after the magnetic force of the magnet acting on the needle plate 62 is reduced.

In addition, a pair of magnets 66 extending along the axial direction of the rotary shaft 68 is aligned in the axial direction of the rotary shaft 68. Consequently, the magnetic force of the magnets 66 can be acted on the needle plate 62 over an approximately entire the axial direction of the rotary shaft 68. Therefore, the needle plate 62 can be fixed by the magnets 66 efficiently. In addition, the cam 70 is arranged between a pair of magnets 66 in the rotary shaft 68. Therefore, the push-up force of the cam 70 for pushing the needle plate 62 upward against the magnetic force of the magnets 66 can be applied to the needle plate 62 in good balance.

In the fixed state of the needle plate 62, the receiving surface 68B2 of the rotary shaft 68 is arranged on the upper side of the magnets 66, and the lower surface of the needle plate 62 is in contact with the receiving surface 68B2 of the rotary shaft 68. Therefore, the vertical position of the needle plate 62 is determined by the receiving surface 68B2 of the rotary shaft 68, and the needle plate 62 is fixed to the bed part 16 by the magnetic force of the magnets 66. Consequently, the vertical position of the needle plate 62 can be determined precisely compared to the configuration where the outer periphery exposed from the rotary shaft 68 of the magnets 66 is formed in an arc surface and the needle plate 62 is in contact with the arc surface of the magnets 66, for example.

In addition, the receiving surface 68B2 of the rotary shaft 68 is curved in an arc shape around the axial center of the rotary shaft 68 when viewed from the axial direction of the rotary shaft 68. Therefore, even if the rotary shaft 68 is displaced in the circumferential direction with respect to the fixed position of the rotary shaft 68, the contact position between the receiving surface 68B2 and the needle plate 62 can be kept constant in the up-down direction. Consequently, the displacement of the rotary shaft 68 in the circumferential direction can be absorbed by the receiving surface 68B2, and the displacement of the needle plate 62 in the up-down direction can be suppressed.

In addition, the magnets 66 are formed in an approximately rectangular columnar shape extending along the axial direction of the rotary shaft 68. Consequently, the magnets 66 for fixing the needle plate 62 can be manufactured at low cost.

In addition, the rotary shaft 68 includes the core portion 68A made of metal to form an axial center of the rotary shaft 68 and the outer shaft portion 68B made of resin to form an outer periphery of the rotary shaft 68. The magnets 66 are embedded in the outer shaft portion 68B, and the cam 70 is integrally formed with the outer shaft portion 68B. Therefore, the rotary shaft 68 rotatable integrally with the magnets 66 and the cam 70 can be manufactured at low cost while the strength of the rotary shaft 68 is kept.

In addition, if the outer shaft portion 68B is formed by a material (POM) having a relatively good sliding property, for example, the cam face 70A is slid well on the needle plate 62 when the rotary shaft 68 is rotated. Thus, the needle plate 62 can be pushed up to the upper side by the cam 70.

Furthermore, since the outer shaft portion 68B is made of resin, generation of abnormal noise (collision noise) can be suppressed between the receiving surface 68B2 of the outer shaft portion 68B and the needle plate 62 when attaching the needle plate 62 on the bed part 16.

In addition, the rotary body driving mechanism 74 is connected with the rotary shaft 68. When the needle plate motor 78 of the rotary body driving mechanism 74 is operated, the rotary shaft 68 is rotated between the fixed position and the release position. Therefore, the needle plate 62 can be automatically detached from the bed part 16. Accordingly, convenience can be improved when the operator detaches (replaces) the needle plate 62 from the bed part 16.

In addition, when the sewing machine motor 22 is not driven and (the needle tip of) the needle 36 is positioned below the upper surface of the needle plate 62, the controller 94 of the needle plate detachable mechanism 60 prohibits the operation of the needle plate motor 78. When the needle 36 is positioned below the upper surface of the needle plate 62, the needle 36 is inserted into the needle hole 62A of the needle plate 62. Therefore, if the needle plate motor 78 is operated in this state, the needle plate 62 is detached from the bed part 16 while the needle 36 is inserted into the needle hole 62A of the needle plate 62. Thus, the above described situation is not suitable for replacing the needle plate 62. Consequently, the replacement of the needle plate 62 can be prevented in the situation not suitable for replacing the needle plate 62 by prohibiting the detachment of the needle plate 62 from the bed part 16.

Furthermore, when the sewing machine motor 22 is driven, the controller 94 prohibits the operation of the needle plate motor 78. When the sewing machine motor 22 is driven, the operator sews sewing objects. Therefore, the operator has no intention to replace the needle plate 62 in the above described situation. Consequently, the above described situation is also not suitable for replacing the needle plate 62. Thus, in the above described situation not suitable for replacing the needle plate 62, the replacement of the needle plate 62 from the bed part 16 is prohibited. Thus, the replacement of the needle plate 62 can be prevented.

As explained above, in the situation not suitable for replacing the needle plate 62, the replacement of the needle plate 62 can be prevented.

In addition, the needle plate detachable mechanism 60 has the upper shaft phase sensor 92. The upper shaft phase sensor 92 detects the rotation phase of the upper shaft 26 which vertically moves the needle 36. Therefore, since the rotation phase (angle) of the upper shaft 26 is detected by the upper shaft phase sensor 92, the vertical position of the needle 36 can be easily detected. Thus, the vertical position of the needle 36 can be detected by a simple configuration in the needle plate detachable mechanism 60.

In addition, the switching mechanism 74 includes the link mechanism 86 which is connected with the rotary shaft 68 and the transmission mechanism 80 which transmits a driving force of the needle plate motor 78 to the link mechanism 86. Consequently, the driving force of the needle plate motor 78 is transmitted to the link mechanism 86 and the rotary shaft 68 can be rotated between the fixed position and the release position. In addition, by using the link mechanism 86, the needle plate motor 78 can be installed in an arbitrary position in the bed part 16 which is separated from the rotary shaft 68.

In addition, the transmission mechanism 80 of the switching mechanism 74 includes the pinion gear 82 which is provided on the output shaft 78A of the needle plate motor 78 so as to be integrally rotated and the oscillating arm 84 having the rack portion 84B engaged with the pinion gear 82. The second link 90 of the link mechanism 86 is connected with the oscillating arm 84 so as to be relatively rotative. Consequently, the rotative force of the needle plate motor 78 is converted into linear motion and the rotary shaft 68 can be reciprocally rotated by the link mechanism 86 by a simple configuration.

In addition, as explained above, the displacement of the rotary shaft 68 in the circumferential direction is absorbed by the receiving surface 68B2. Therefore, even when the magnets 66 for fixing the needle plate 62 are provided on the rotary shaft 68, it is not required to keep the rotary shaft 68 in the fixed position by constantly supplying electrical power to the needle plate motor 78. Consequently, power consumption of the sewing machine 10 can be reduced.

In addition, the operation dial 72 is provided on the rear end of the rotary shaft 68 so as to be integrally rotated with the rotary shaft 68. The operation dial 72 is exposed outside the cover 50 so as to be operable. Therefore, when the operation dial 72 is rotationally operated, the fixed state of the needle plate 62 can be released by manually rotating the rotary shaft 68. Consequently, the needle plate 62 can be removed from the bed part 16 in an emergency, for example, when the needle plate motor 78 is broken.

Second Embodiment

Figure 8:
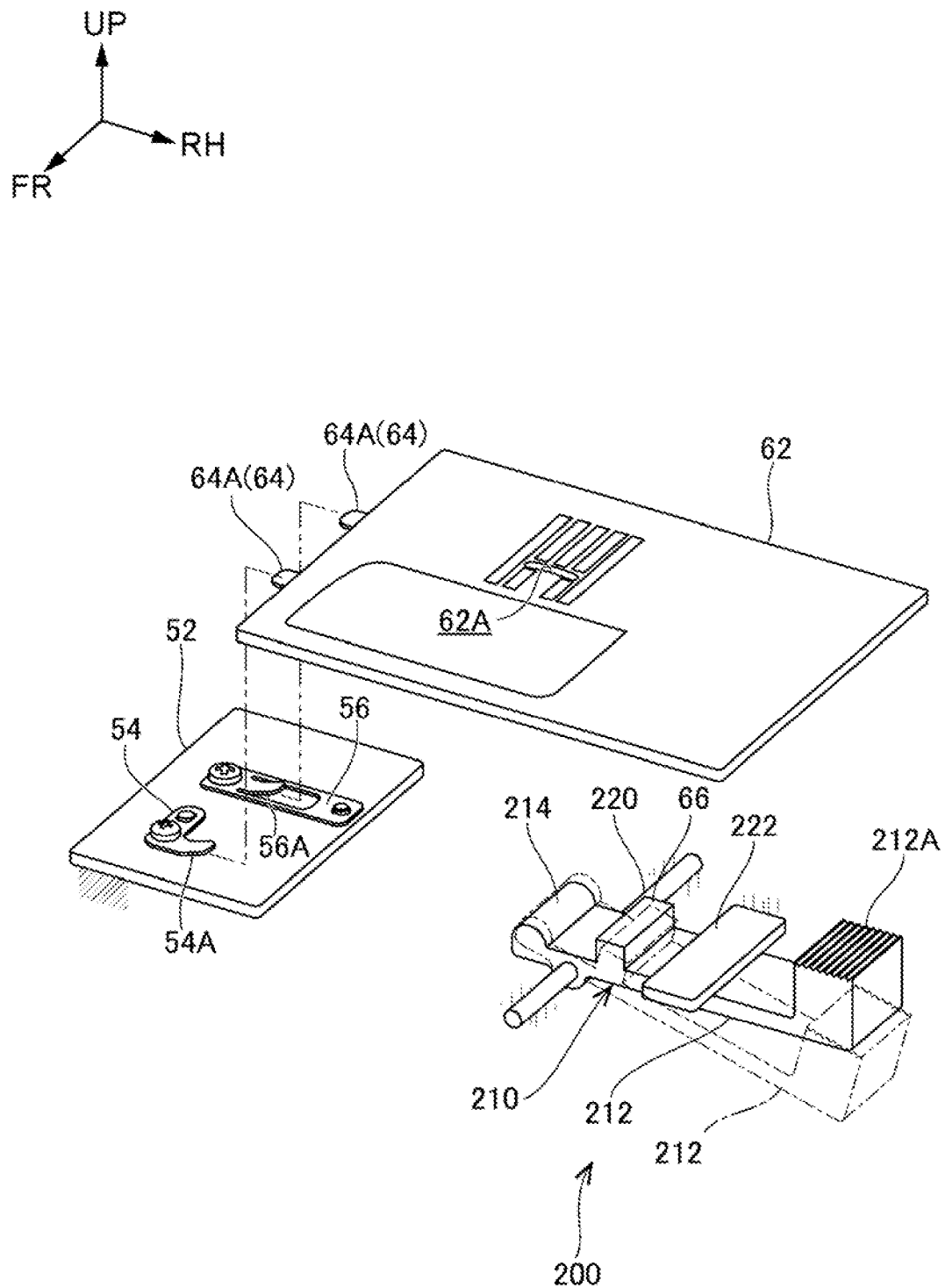
FIG. 8 is an exploded perspective view of a needle plate detachable mechanism of the second embodiment.
Figure 9:
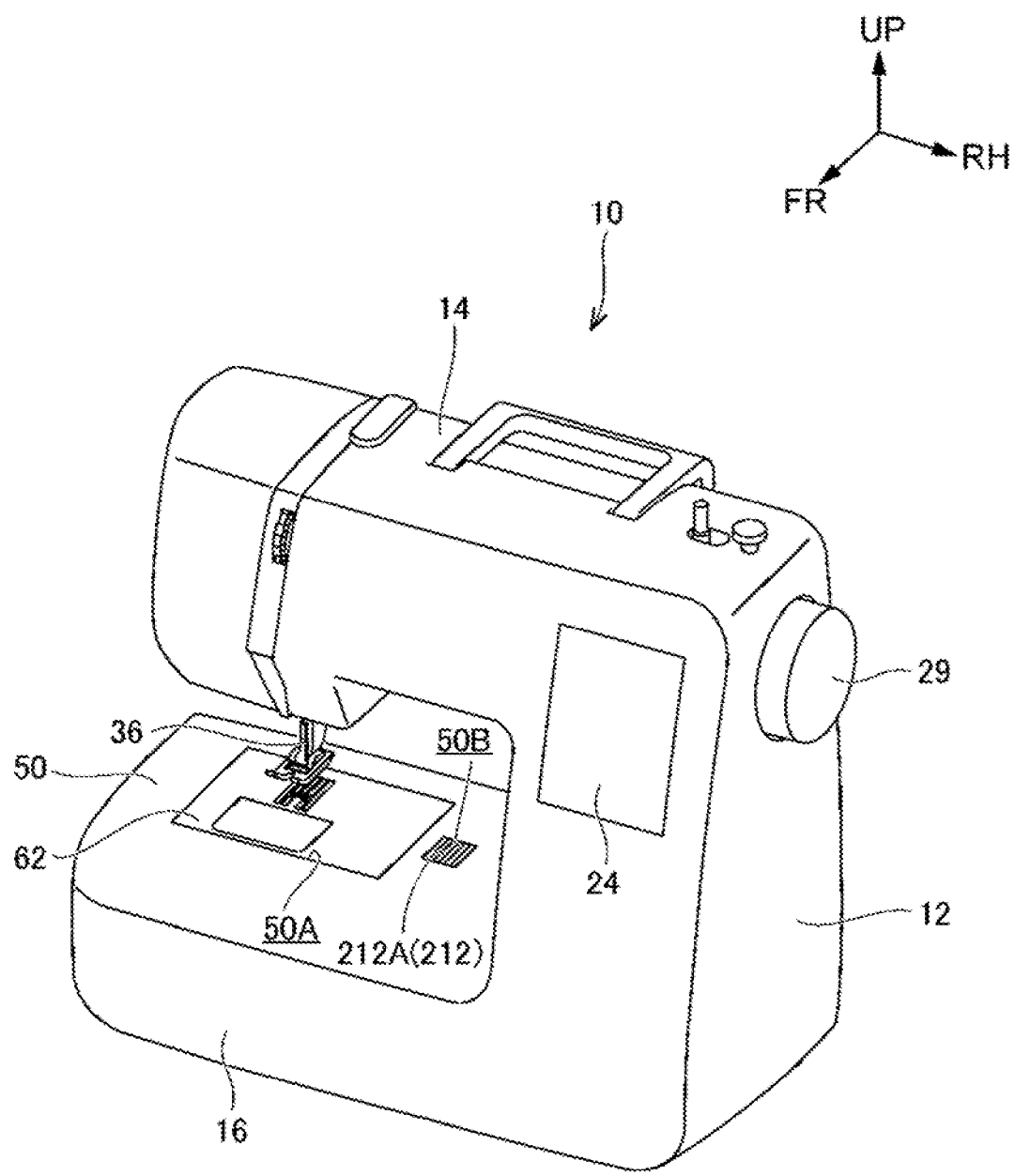
FIG. 9 is a perspective view of an entire sewing machine to which the needle plate detachable mechanism of the second embodiment is applied, viewed obliquely from the front right.

Hereafter, a needle plate detachable mechanism 200 of the second embodiment will be explained with reference to FIGS. 8-10. The needle plate detachable mechanism 200 has a magnetic force changing mechanism 210. The magnets 66 are provided on the magnetic force changing mechanism 210. In addition, the needle plate detachable mechanism 200 does not have the rotary body driving mechanism 74 of the magnetic force changing mechanism 67 shown in the first embodiment. Namely, the magnetic force changing mechanism 210 is configured to be manually operable. Hereafter, the magnets 66 and the needle plate detachable mechanism 200 will be mainly explained.

The magnetic force changing mechanism 210 includes a lever 212 which functions as "rotary body" and a release projection 214 which functions as "push-up portion" provided on the lever 212.

The lever 212 is formed in an approximately rectangular plate shape so that the plate thickness direction is aligned with the up-down direction and the longitudinal direction is aligned with the left-right direction. The lever 212 is arranged below the right part of the needle plate 62 to be separately from the needle plate 62. In addition, the lever 212 is rotatably supported by a support shaft 220 at the left part of the lever 212 so that the axial direction of the support shaft 220 is aligned with the front-rear direction. Consequently, the lever 212 is rotatably supported around an axis which is parallel with the needle plate 62. Note that both ends in the longitudinal direction of the support shaft 220 are fixed to the skeleton frame of the sewing machine 10. Consequently, the lever 212 is rotatable around the axis of the support shaft 220 in one of the rotation directions (direction of Arrow C in FIG. 10A) and the other of the rotation directions (direction of Arrow D in FIG. 10B)

In addition, a receiving plate 222 is provided on the right side of the support shaft 220 so that the plate thickness direction is aligned with the up-down direction. The receiving plate 222 is an element realized as "receiving member" in a broad sense. The receiving plate 222 is fixed to the skeleton frame of the sewing machine 10. The receiving plate 222 is arranged adjacent to the lower side of the right end of the needle plate 62 to support the right end of the needle plate 62 from the lower side. In the fixed position of the lever 212 shown in FIG. 10A, the upper side of the lever 212 is arranged adjacent to the lower side of the receiving plate 222 at the right part of the support shaft 220. Consequently, the rotation of the lever 212 to the other of the rotation directions is limited in the fixed position.

The magnets 66 are formed in an approximately rectangular parallelepiped shape and fixed to the upper surface of the lever 212 at the right part of the support shaft 220. In the fixed position of the lever 212, the magnets 66 are arranged adjacent to the lower side of the right part of the needle plate 62 and arranged on the left part of the receiving plate 222. Thus, the needle plate 62 is fixed to the bed part 16 by the magnetic force of the magnets 66. Consequently, when the lever 212 is rotated in one of the rotation directions from the fixed position, the magnets 66 are relatively moved (displaced) downward with respect to the needle plate 62. Thus, the magnetic force of the magnets 66 acting on the needle plate 62 is reduced.

The release projection 214 is integrally provided on the left end (one end) of the lever 212 and projected upward from the left end. When viewed from the front side, the release projection 214 is formed in an approximately semicircular shape projecting upward and extending in the front-rear direction. In addition, the release projection 214 is arranged adjacent to the lower side of the needle plate 62. Specifically, the release projection 214 is arranged to be separated by a predetermined distance from the needle plate 62. When the lever 212 is rotated in one of the rotation directions (toward the release position) from the fixed position, the release projection 214 abuts with the needle plate 62. Consequently, the release projection 214 pushes the needle plate 62 upward.

On the other hand, an operation part 212A projecting upward is formed on the right end of the lever 212. The operation part 212A is exposed from an operation hole 50B (shown in FIG. 9) formed on the cover 50 of the sewing machine 10 so as to be operable. Consequently, when the operator pushes the operation part 212A downward, the lever 212 is rotated in one of the rotation directions from the fixed position. In addition, the distance between the support shaft 220 and the operation part 212A is configured to be longer than the distance between the support shaft 220 and the release projection 214 in the longitudinal direction (left-right direction) of the lever 212.

In order to release the fixed state of the needle plate 62, in the state shown in FIG. 10A, the operator pushes the operation part 212A of the lever 212 downward. Consequently, the lever 212 is rotated in one of the rotation directions from the fixed position. Specifically, the magnets 66 fixed to the lever 212 are displaced downward and separated from the needle plate 62, and the release projection 214 of the lever 212 is displaced upward and moved close to the needle plate 62. When the lever 212 is further rotated in one of the rotation directions, the release projection 214 abuts with the needle plate 62 and pushes the needle plate 62 upward. As shown in FIG. 10B, when the lever 212 is rotated to the release position, the right end of the needle plate 62 is pushed upward from the bed part 16 (not shown in FIG. 10B) and the needle plate 62 is detached from the bed part 16.

On the other hand, in order to attach the needle plate 62 to the bed part 16 again, the locking pieces 64A of the locking member 64 of the needle plate 62 are inserted into a gap between the fixing plate 52 and the pressing pieces 54A, 56A and the right end of the needle plate 62 is placed on the release projection 214 in the release position (the state shown in FIG. 10B). At that time, the lever 212 is rotated in the other of the rotation directions from the state shown in FIG. 10B by the weight of the needle plate 62 or by inputting the downward operation force to the needle plate 62 by the operator. Consequently, the magnets 66 and the needle plate 62 gradually approach to each other. Thus, the magnetic force of the magnets 66 acting on the needle plate 62 is gradually increased. When the lever 212 is further rotated in the other of the rotation directions and reached to the fixed position, the needle plate 62 is fixed to the bed part 16 by the magnetic force of the magnets 66.

In the second embodiment, the magnets 66 are provided on the lever 212 of the magnetic force changing mechanism 210 so as to be integrally rotated, and the lever 212 is rotatable around the axis of the support shaft 220 which is parallel with the needle plate 62. Therefore, when the lever 212 is rotated in the fixed position of the lever 212, the magnetic force can be changed so that the magnetic force of the magnets 66 acting on the needle plate 62 is gradually reduced. Thus, the releasing force for releasing the fixed state of the needle plate 62 can be reduced compared to the case where the magnets 66 cannot be relatively moved (displaced) with respect to the needle plate 62. As a result, when the needle plate 62 is detached from the bed part 16, the needle plate 62 is prevented from being suddenly jumped up from the bed part 16. Accordingly, the detachability of the needle plate 62 can be improved in also the second embodiment, same as the first embodiment.

In addition, the release projection 214 is provided on the left end of the lever 212. As explained above, when the lever 212 is rotated in one of the rotation directions from the fixed position, the release projection 214 is displaced upward to push the needle plate 62 upward. Consequently, the needle plate 62 is pushed up from the bed part 16. Accordingly, convenience for replacing the needle plate 62 can be improved.

In addition, the release projection 214 of the lever 212 is arranged below the needle plate 62 to be separated by a predetermined distance from the needle plate 62. Therefore, when the lever 212 is rotated in one of the rotation directions from the fixed position, the release projection 214 can be in contact with the needle plate 62 after the magnetic force of the magnets 66 acting on the needle plate 62 is reduced. Therefore, the needle plate 62 can be pushed upward by the release projection 214 while the releasing force acting from the release projection 214 to the needle plate 62 is reduced.

In the second embodiment, the release projection 214 is provided on the left end of the lever 212, the operation part 212A is provided on the right end of the lever 212, and an intermediate portion in the longitudinal direction (left-right direction) of the lever 212 is rotatably supported by the support shaft 220. Consequently, when operating (pushing) the operation part 212A, the needle plate 62 can be pushed upward by (the release projection 214 of) the lever 212 using the principle of lever. Consequently, the needle plate 62 can be easily pushed upward by the release projection 214.

Furthermore, the distance between the support shaft 220 and the operation part 212A is configured to be longer than the distance between the support shaft 220 and the release projection 214 in the longitudinal direction of the lever 212. Therefore, the needle plate 62 can be more easily pushed upward by the release projection 214.

In addition, the magnets 66 are arranged between the support shaft 220 and the operation part 212A in the left-right direction. Namely, the distance between the support shaft 220 and the operation part 212A is configured to be longer than the distance between the support shaft 220 and the magnets 66. Consequently, the operation force to be inputted in the operation part 212A can be reduced compared to the case where the distance between the support shaft 220 and the operation part 212A is shorter than the distance between the support shaft 220 and the magnets 66. Accordingly, operability can be improved when the operator operates the lever 212.

In the second embodiment, although the needle plate detachable mechanism 200 is configured to be manually operable, it is also possible to apply the rotary body driving mechanism 74 of the first embodiment to the needle plate detachable mechanism 200 so that the lever 212 is rotated by the driving force of the needle plate motor 78. In the above described case, in the needle plate detachable mechanism 200, the lever 212 and the support shaft 220 are configured to be integrally rotated and both ends in the longitudinal direction of the support shaft 220 are rotatably supported by the skeleton frame of the sewing machine, for example. In addition, one end of the first link 88 of the link mechanism 86 is connected with the support shaft 220 so as to be integrally rotated. Consequently, the lever 212 can be rotated to the fixed position or the release position by the driving of the needle plate motor 78. Accordingly, convenience of the operator can be improved.

In addition, when the rotary body driving mechanism 74 of the first embodiment is applied to the needle plate detachable mechanism 200 of the second embodiment, the replacement of the needle plate 62 can be prohibited in the situation not suitable for replacing the needle plate 62, same as the first embodiment.

In addition, although the rotary body driving mechanism 74 is connected with the rotary shaft 68 in the first embodiment, the rotary body driving mechanism 74 can be omitted in the needle plate detachable mechanism 60, same as the second embodiment. Namely, the needle plate 62 can be configured to be detachable with the bed part 16 by manually rotating the rotary shaft 68.

In addition, the cam face 70A of the cam 70 slides on the needle plate 62 and pushes up the needle plate 62 when the rotary shaft 68 is rotated in the first embodiment, the configuration of pushing up the needle plate 62 is not limited to the above described configuration. For example, a release pin having a bar shape projecting outward in the radial direction can be formed on the rotary shaft 68 so that the tip end of the release pin abuts with the lower surface of the needle plate 62 to push the needle plate 62 upward by the tip end when the rotary shaft 68 is rotated.

In addition, although the rotary shaft 68 is formed by the core portion 68A made of metal and the outer shaft portion 68B made of resin in the first embodiment, the configuration of the rotary shaft 68 is not limited to the above described configuration. For example, entire the rotary shaft 68 can be made of resin or metal.

Although the operation dial 72 is formed on the rear end of the rotary shaft 68 so as to be integrally rotated in the first embodiment, the operation dial 72 can be omitted in the rotary shaft 68. In the above described case, the rotary shaft 68 can be formed in a long cylindrical shape to rotatably support the rotary shaft 68 by the support shaft fixed to the skeleton frame, for example.

In addition, the upper surface of the magnets 66 is arranged slightly separated downward from the needle plate 62 in the fixed state of the needle plate 62 in the first embodiment, the upper surface of the magnets 66 can be in contact with the lower surface of the needle plate 62. In the above described case, the upper surface of the magnets 66 can be curved in an approximately arc shape around the axial center of the rotary shaft 68 when viewed from the axial direction of the rotary shaft 68 so that the upper surface of the magnets 66 is flush with the receiving surface 68B2 of the rotary shaft 68.

In addition, the operation part 24 of the sewing machine 10 is formed as the operation part including the display part and the touch panel in the first embodiment. Instead of the above described configuration, the operation part 24 can be formed by a plurality of operation buttons exposed outside the sewing machine 10 so as to be operable. In the above described case, the controller 94 can be configured not to receive the operation signals from the operation part 24 when the sewing machine motor 22 is not driven and (the needle tip of) the needle 36 is positioned below the upper surface of the needle plate 62 or when the sewing machine motor 22 is driven even if the operation buttons are operated.

In addition, entire the needle plate 62 is made of the magnetic body in the first embodiment and the second embodiment. However, it is not necessary to form the entire the needle plate 62 by the magnetic body. Since it is enough that the magnets 66 are magnetically attached to the needle plate 62, only the portion to be in contact with the upper surface of the magnets 66 can be made of the magnetic body when the needle plate 62 is in the fixed state. Accordingly, the present invention can be carried out even if the needle plate 62 made of resin is used by partly attaching a metal plate (magnetic body), for example. Namely, the present invention includes the configuration where a part of the needle plate 62 is formed by the magnetic body.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A needle plate detachable mechanism of a sewing machine which forms a seam by vertically driving a needle by a driving force of a sewing machine motor, the needle plate detachable mechanism comprising:
    a needle plate which is provided on a bed part of the sewing machine and made of a magnetic body;
    a magnet which is provided below the needle plate for fixing the needle plate by magnetic force; and
    a magnetic force changing mechanism which is connected with the magnet for changing the magnetic force acting on the needle plate by relatively moving the magnet with respect to the needle plate, wherein
        the magnetic force changing mechanism has a rotary body which is arranged below the needle plate and rotatable around an axis parallel with the needle plate, and
        the magnet is provided on the rotary body to be rotatable integrally with the rotary body.

2. The needle plate detachable mechanism according to claim 1, wherein
    the magnetic force changing mechanism has a push-up portion which is rotatable integrally with the rotary body, and
    the push-up portion pushes the needle plate upward when the rotary body is rotated.

3. The needle plate detachable mechanism according to claim 1, wherein
    a rotary body driving mechanism is connected with the rotary body, and
    the rotary body driving mechanism has a rotary body driving motor for driving the rotary body.

4. The needle plate detachable mechanism according to claim 3, wherein
    an operation of the rotary body driving motor is prohibited in a fixed state of the needle plate when the needle is positioned below an upper surface of the needle plate or when the sewing machine motor is driven.

5. A sewing machine having the needle plate detachable mechanism of claim 1.

* * * * *